Sept. 7, 1943. C. D. BONSALL 2,328,947
REFRIGERATOR CAR CONSTRUCTION
Filed May 5, 1941 2 Sheets-Sheet 1

INVENTOR.
Charles D. Bonsall
BY
Attorney

Sept. 7, 1943.   C. D. BONSALL   2,328,947
REFRIGERATOR CAR CONSTRUCTION
Filed May 5, 1941   2 Sheets-Sheet 2
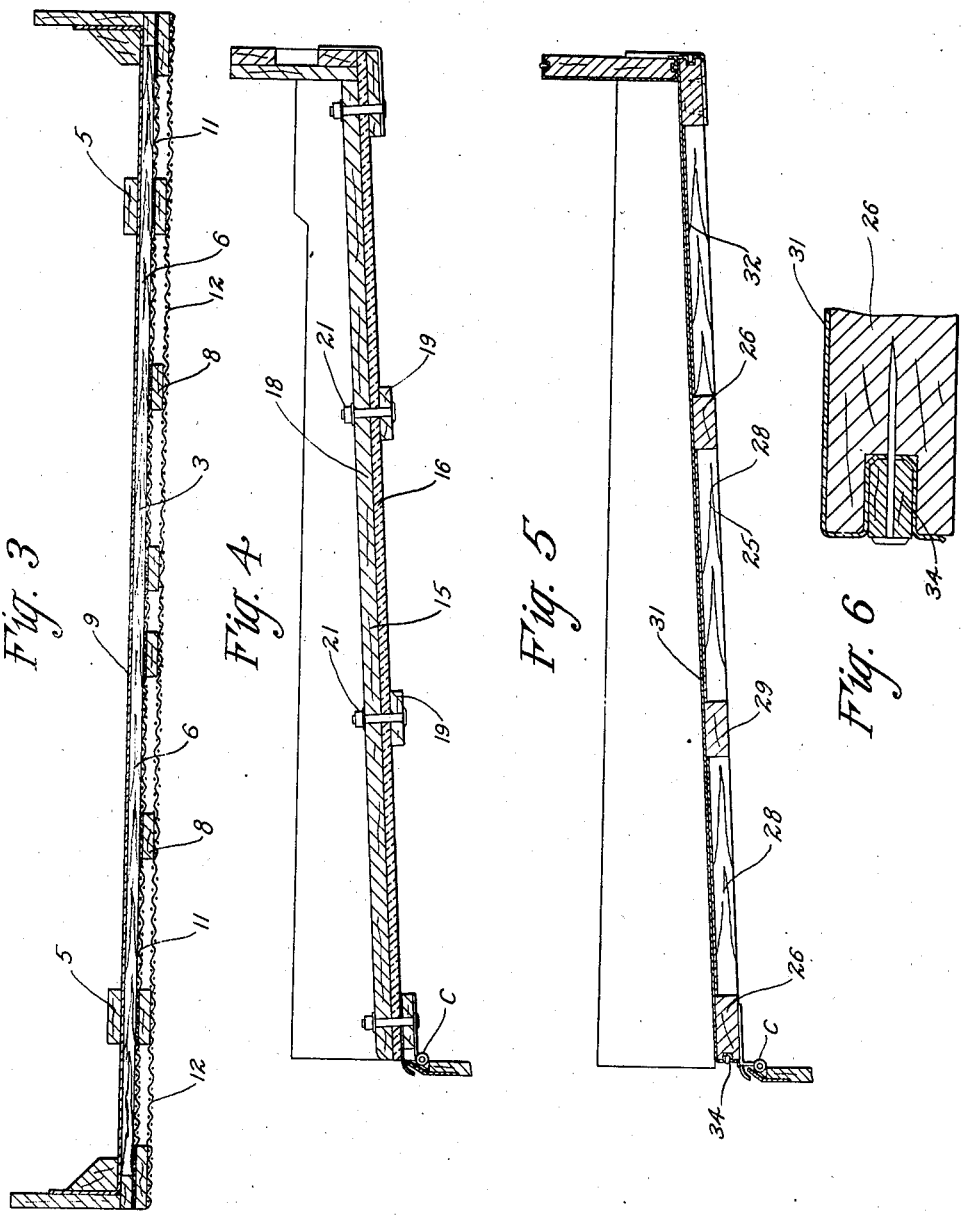
INVENTOR.
Charles D. Bonsall
BY
Attorney Patented Sept. 7, 1943

2,328,947

UNITED STATES PATENT OFFICE 2,328,947

REFRIGERATOR CAR CONSTRUCTION

Charles D. Bonsall, Chicago, Ill., assignor to Standard Railway Devices Company, a corporation of Delaware Application May 5, 1941, Serial No. 391,840

11 Claims. (Cl. 62—17)

This invention relates to refrigerator cars used to transport perishable commodities at a predetermined temperature. The essential features of a refrigerator car are an insulated body to prevent or retard ingress of heat during warm weather and egress of heat during cold weather, and a cooling means and often a heating means to be used during warm and cold weather respectively.

This invention applies particularly to cars in which the cooling means, preferably containers for water ice, eutectic ice, brine or dry ice, are disposed immediately below the roof of the car. The lading is supported in spaced relation to the floor by a foraminous rack. Flues, preferably associated with the side walls of the car, communicate between the cooling means and the space under the floor rack to provide a path for the circulation of air. The path is from the cooling means downwardly through the aforementioned flues, through the space under the floor rack, upwardly through the lading compartment thereby cooling the lading, and finally to the cooling means from where the cycle is repeated.

The type of commodity hauled in a refrigerator car of this type and the method employed for loading such commodity are important factors in the refrigerating efficiency of the car. The lading should preferably be loaded loosely, so as to leave air channels for the flow of cold air through the lading compartment from the lower to the upper part of the car. If the lading is loaded tightly, no air channels are provided and the cold air is prevented from reaching the upper part of the lading compartment; the commodity in such upper part is, therefore, not well refrigerated.

Certain commodities, particularly fresh fruits and vegetables, give off heat of respiration caused by chemical changes which occur within the fruit or vegetable during ripening thereof. The air within the lading compartment is warmed by the heat of respiration and has a tendency to collect in the upper part of the lading compartment, thereby maintaining the upper part of the lading at a relatively high temperature.

Commodities such as fresh fruits and vegetables contain a large percentage of liquid and when the circulating air passes over such a commodity, some of the liquid is evaporated and carried away by the air in the form of vapor. When such vapor-laden air touches the relatively cold drip pans which are usually provided below the refrigerant containers, moisture is condensed from the air by the cold pans and drips upon the commodity. The commodity may be damaged by such moisture and, in most cases, the cartons which contain the commodity are soiled and their marketable value decreased.

An object of the invention is to provide drip pans below the refrigerant containers, which drip pans have a relatively high thermal conductivity so that when the commodity is tightly loaded in the lading compartment, the upper parts of the commodity may be cooled by conduction through the drip pans.

Another object is to form the above mentioned drip pans in such a way that moisture condensed from the air by contact of such air with the cold drip pans is prevented from dripping into the lading compartment.

More particularly, the object of the invention is to absorb such condensed moisture and thereby prevent it from dripping into the lading compartment. In one modification of my invention, I disclose a drip pan comprised of a relatively thin metallic sheet and material subjacent to said metallic sheet to absorb any moisture which drips from the under side of the metallic sheet. An example of the subjacent material is burlap made of large diameter, non-sized strands loosely woven so as to provide openings between the strands for flow of air through such burlap. The strands are preferably non-sized so that they are absorbent and of large diameter to absorb large quantities of liquid. I also disclose other means of accomplishing the objects which will be apparent from the following detailed description.

In the drawings:

Fig. 3 is a section through the drip pan shown in Fig. 2 as indicated by line 3—3.

Figs. 4 and 5 are views similar to Fig. 2 showing modified forms of the invention.

Fig. 6 is an enlarged view of a portion of Fig. 5.

The general parts of the refrigerator car shown are insulated roof A; side walls B; floor D; refrigerant containers E; hatches F for loading refrigerant into the containers E; side wall flues G; foraminous floor rack H and space J between the rack H and the floor D. A refrigerant container E is positioned directly below the roof A and adjacent a side wall B. A drip pan K, preferably hinged (C) to the side wall B, is provided below the container E and a partition L is disposed in an upstanding position at the edge of and preferably formed integral with the drip pan K. The drip pan K and the partition L cooperate with the roof A and the upper part of the side wall B to form an enclosure M around the container E, an air inlet opening N to the enclosure M being provided by spacing the partition L from the roof A. An air discharge opening P leads from the enclosure M to the flue G at a lower elevation than the air inlet opening N. The containers E may be provided with apertures O for overflow of liquid refrigerant, which refrigerant is conducted by the drip pans K and flues G to the lower part of the car from which it may be drained by suitable means. Cars of this type commonly have a row of refrigerant containers E near each side wall B, which containers are spaced apart at the center of the car. The partitions L are also spaced apart to form a duct Q which communicates between the lading compartment R and openings N.

Air circulation is as follows: Air in the lading compartment R is warmed by contact with the lading and rises through the duct Q to enter the enclosing structures M through the air inlet openings N. The air is then cooled by contact with the cold refrigerant containers E and falls by reason of its lower temperature and therefore greater density through the discharge openings P and flues G to the space J whence it rises through the rack H to the lading compartment R. The above described cycle is thereafter continuously repeated.

Figure 1:
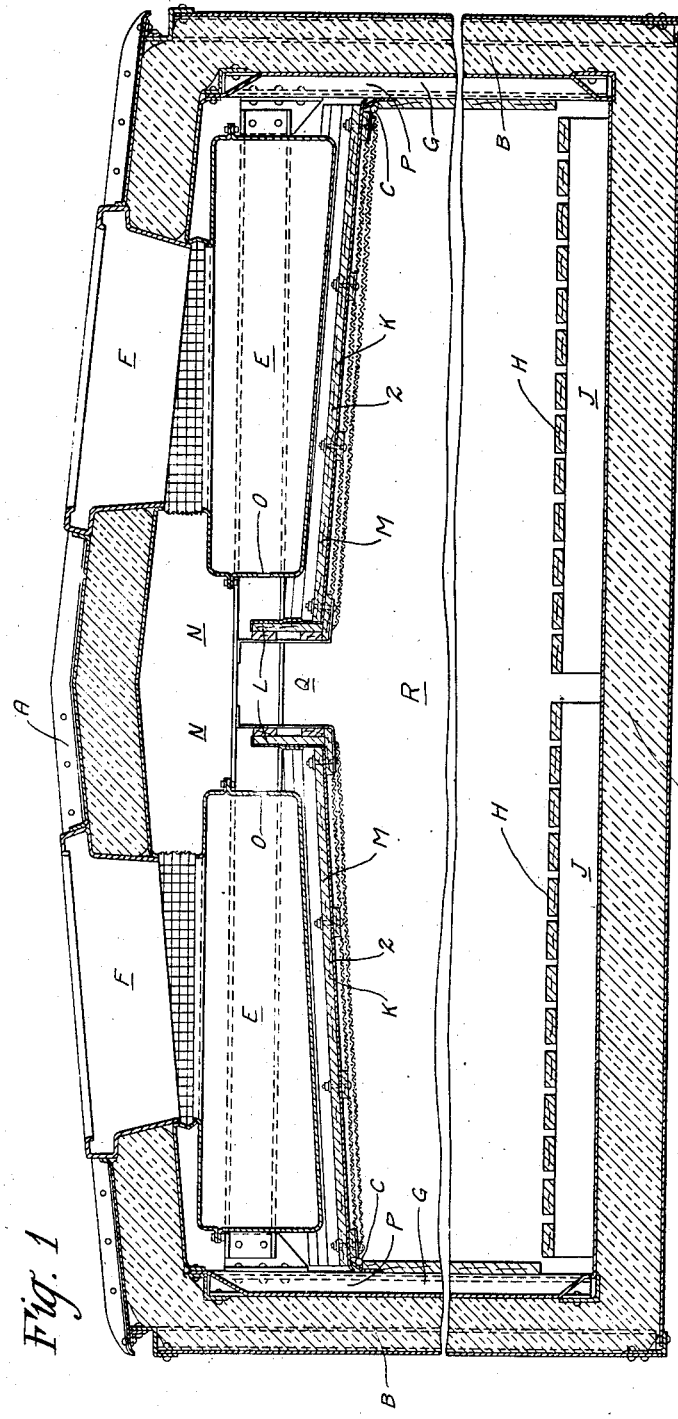
Fig. 1 is a transverse section through a refrigerator car embodying my invention.
Figure 2:
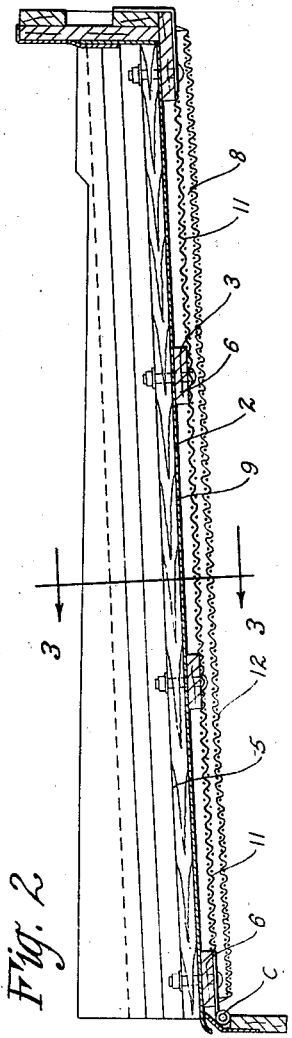
Fig. 2 is an enlarged view of drip pan shown in Fig. 1.

The drip pan 2 shown in Figures 1 to 3 is preferably comprised of a framework 3 which, in the form shown, is wood and consists of main battens 5 extending transversely of the car, stringers 6 extending longitudinally of the car and sub-battens 8 extending transversely of the car below the stringers 6. A metallic sheet 9 is included between the main battens 5 and the stringers 6, the sheet 9 preferably being of light gauge in order to have a light weight and a relatively high thermal conductivity and being substantially continuous over the area of the drip pan 2 in order to be water-tight. Two layers of absorbent fabrice are provided. The upper layer 11 of fabric is confined between the stringers 6 and the sub-battens 8, preferably being tacked or otherwise secured to the stringers, and the lower layer 12 of fabric is disposed below the sub-battens 8 and secured thereto by a suitable means.

The above mentioned fabric should be both absorbent and woven so as to permit free passage of air therethrough. The strands which comprise the fabric should preferably have a relatively large diameter so as to absorb a large quantity of moisture and should not be treated or sized to make them non-absorbent or impervious to moisture. The air in the upper part of the lading compartment R filters through the two layers 11, 12 of fabric and is cooled by contact with the lower surface of the metallic sheet 9. Moisture which is condensed from the air by contact with the cold metallic sheet 9 drips from such sheet and is absorbed by the upper layer 11 of fabric. If such upper layer 11 should become saturated with liquid, further condensation may be absorbed by the lower layer 12 of the fabric.

In the modification shown in Figure 4, the drip pan 15 is comprised of a slab of tile 16 or similar material reinforced by battens 18 thereabove and stringers 19 therebelow. The battens 18, stringers 19 and tile 16 are rigidly secured together by bolts 21. The upper surface of the tile 16 is glazed in order to shed liquid deposited thereon by the container E and the lower surface of the tile 16 is porous so as to absorb moisture condensed from the air by the cold tile.

In the modification shown in Figures 5 and 6, the drip pan 25 is comprised of a framework 26 made up of battens 28 and stringers 29 secured together, preferably in a common plane. The framework 26 is covered by material 31 such as water-proof canvas, oiled silk or linoleum, which material 31 is stretched tightly over the framework 26 and arranged to shed liquid deposited thereon by the refrigerant container E. The lower side of the material 31 is covered with felt 32 or other absorbent material glued or cemented thereto so as to absorb moisture condensed from the air. The material 31 may be secured to the framework 26 by means of the groove and cleat 34 shown to an enlarged scale in Figure 6.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition, and a lower part adapted to absorb moisture, said lower part being of a nature to permit air in the upper part of said storage compartment to contact said upper part of the partition.

2. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a rigid framework arranged to support a relatively thin metallic sheet, whereby the upper part of said storage compartment is refrigerated by conduction through said partition, and a moisture absorbing material spaced below said metallic sheet, said material being of a nature to permit air in the upper part of said storage compartment to contact said metallic sheet.

3. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a relatively thin metallic sheet whereby the upper part of said storage compartment is refrigerated by conduction through said partition, and a loosely woven and moisture absorbing fabric spaced below said metallic sheet.

4. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition having a relatively high thermal conductivity, whereby the upper part of said storage compartment is refrigerated by conduction through said partition.

5. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising an upper part having a relatively high thermal conductivity, whereby the upper part of said storage compartment is refrigerated by conduction through said partition, and a lower part adapted to absorb moisture.

6. In a refrigerator having a storage compartment, the combination of a refrigerant container above the storage compartment, an enclosure for said container formed at least in part by a partition below said container, means to conduct cold air from said enclosure to the lower part of said storage compartment, means to direct warm air from the upper part of said storage compartment to said enclosure, said partition having a relatively high thermal conductivity, whereby the upper part of said storage compartment is refrigerated by conduction through said partition, and means to prevent dripping of condensation from said partition into said storage compartment.

7. A structure as defined in claim 4 wherein said partition comprises a relatively rigid framework covered with waterproofed fabric.

8. In a refrigerator having a storage compartment and refrigerating means above the storage compartment, a partition interposed between said compartment and said means comprising an upper part having a relatively high thermal conductivity, and a lower part formed of loosely woven and moisture absorbing fabric spaced below said upper part.

9. A partition adapted to be used in a substantially horizontal position between the storage compartment and the refrigerating means of a refrigerator comprising an upper part having relatively high thermal conductivity, and a lower part formed of loosely woven and moisture absorbing fabric spaced below said upper part.

10. In a refrigerator having a storage compartment, refrigerating means above the storage compartment, and a drip pan interposed between said compartment and said means, said drip pan comprising a waterproof upper part having a relatively high thermal conductivity and a lower part formed of loosely woven and moisture absorbing fabric.

11. In a refrigerator having a storage compartment, refrigerating means above the storage compartment, a partition interposed between said compartment and said means, said partition comprising an upper part having a relatively high thermal conductivity, and a moisture absorbing lower part of such a nature to permit air in the upper part of the storage compartment to contact the upper part of the partition.

CHARLES D. BONSALL.